United States Patent
Frank

(10) Patent No.: US 7,219,180 B1
(45) Date of Patent: *May 15, 2007

(54) COMBINED UNINTERRUPTABLE POWER SUPPLY AND BUS CONTROL MODULE TO IMPROVE POWER MANAGEMENT AND LEGACY SUPPORT

(75) Inventor: Andrew Frank, Woodland Hills, CA (US)

(73) Assignee: Digi International Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,299

(22) Filed: Apr. 18, 2000

(51) Int. Cl.
*G06F 13/00* (2006.01)

(52) U.S. Cl. .................. 710/300; 710/305; 710/313; 710/315

(58) Field of Classification Search ............... 710/53, 710/62, 63, 100, 104, 105, 110, 72, 300, 314, 710/316; 716/8–11; 709/250
See application file for complete search history.

(56) References Cited

U.S. PATENT DOCUMENTS

| | | | |
|---|---|---|---|
| 4,401,351 A | 8/1983 | Record | |
| 5,656,869 A | 8/1997 | Gluskoter et al. | |
| 5,781,747 A | 7/1998 | Smith et al. | |
| 5,784,581 A * | 7/1998 | Hannah | 710/110 |
| 5,799,196 A | 8/1998 | Flannery | |
| 6,081,856 A | 6/2000 | Comer | |
| 6,131,125 A * | 10/2000 | Rostoker et al. | 709/250 |
| 6,247,078 B1 | 6/2001 | Ebert et al. | |
| 6,324,605 B1 * | 11/2001 | Rafferty et al. | 710/100 |
| 6,334,160 B1 | 12/2001 | Emmert et al. | |
| 6,438,708 B1 | 8/2002 | Shinichi et al. | |
| 6,549,966 B1 * | 4/2003 | Dickens et al. | 710/300 |
| 6,625,790 B1 * | 9/2003 | Casebolt et al. | 716/8 |
| 6,718,415 B1 | 4/2004 | Chu | |
| 6,799,196 B1 | 9/2004 | Smith | |
| 6,851,068 B2 | 2/2005 | Jochiong et al. | |
| 6,904,530 B2 * | 6/2005 | Frank | 713/300 |
| 2005/0289370 A1 | 12/2005 | Frank | |

FOREIGN PATENT DOCUMENTS

JP 08-033233 2/1996

* cited by examiner

*Primary Examiner*—Khanh Dang
(74) *Attorney, Agent, or Firm*—Schwegman, Lundberg, Woessner, & Kluth, P.A.

(57) ABSTRACT

A system and apparatus providing power management and legacy support. An uninterruptable power supply is combined with a bus control module. The bus control module provides legacy support through a single connectivity. The bus control module monitors and controls power distribution within the system. A bus hub unit is coupled to the bus control module and provides a plurality of ports to which bus functions may be coupled.

23 Claims, 2 Drawing Sheets

COMBINED UNINTERRUPTABLE POWER SUPPLY AND BUS CONTROL MODULE TO IMPROVE POWER MANAGEMENT AND LEGACY SUPPORT

BACKGROUND (1) Field of the Invention

The invention relates to power management and data transfer. More specifically, the invention relates to power management of power delivered over a bus.

(2) Background

Some prior art systems employ an uninterruptible power supply (UPS) in which an alternating current to direct current (AC to DC) converter receives an AC signal, from for example, a wall socket, and converts the signal to DC which is used to charge a battery within the UPS. A DC signal is reconverted to AC and supplied back out to connected devices. In the event of a power outage, the UPS permits an orderly shut down of the system by supplying power previously stored in the battery. Typically, external devices expect to receive 220 or 110 volts AC from a standard electrical outlet. The battery power is converted from DC to the expected 110 or 220 volts AC. Such devices typically each have their own internal AC to DC converter. Using that converter, the power supplied is again converted to DC for use in the device.

The traditional personal computer (PC) or workstation market is based on expansion capability of the unit. This has typically included such bussing structures as ISA, EISA, and PCI, as well as PCMCIA cards, all of which fall under the broad category of legacy expansion methods. Price pressures and size reduction demands have necessitated providing for relatively small number of external connectivities. The recent trend has been to move the PC in the direction of a sealed box. This trend tends to increase the relative difficulty of power management of the overall system, as well as legacy support.

BRIEF SUMMARY OF THE INVENTION

A system and apparatus providing power management and legacy support is disclosed. An uninterruptable power supply is combined with a bus control module. The bus control module provides legacy support through a single connectivity. The bus control module monitors and controls power distribution within the system. A bus hub unit is coupled to the bus control module and provides a plurality of ports to which bus functions may be coupled.

DETAILED DESCRIPTION

Figure 1:
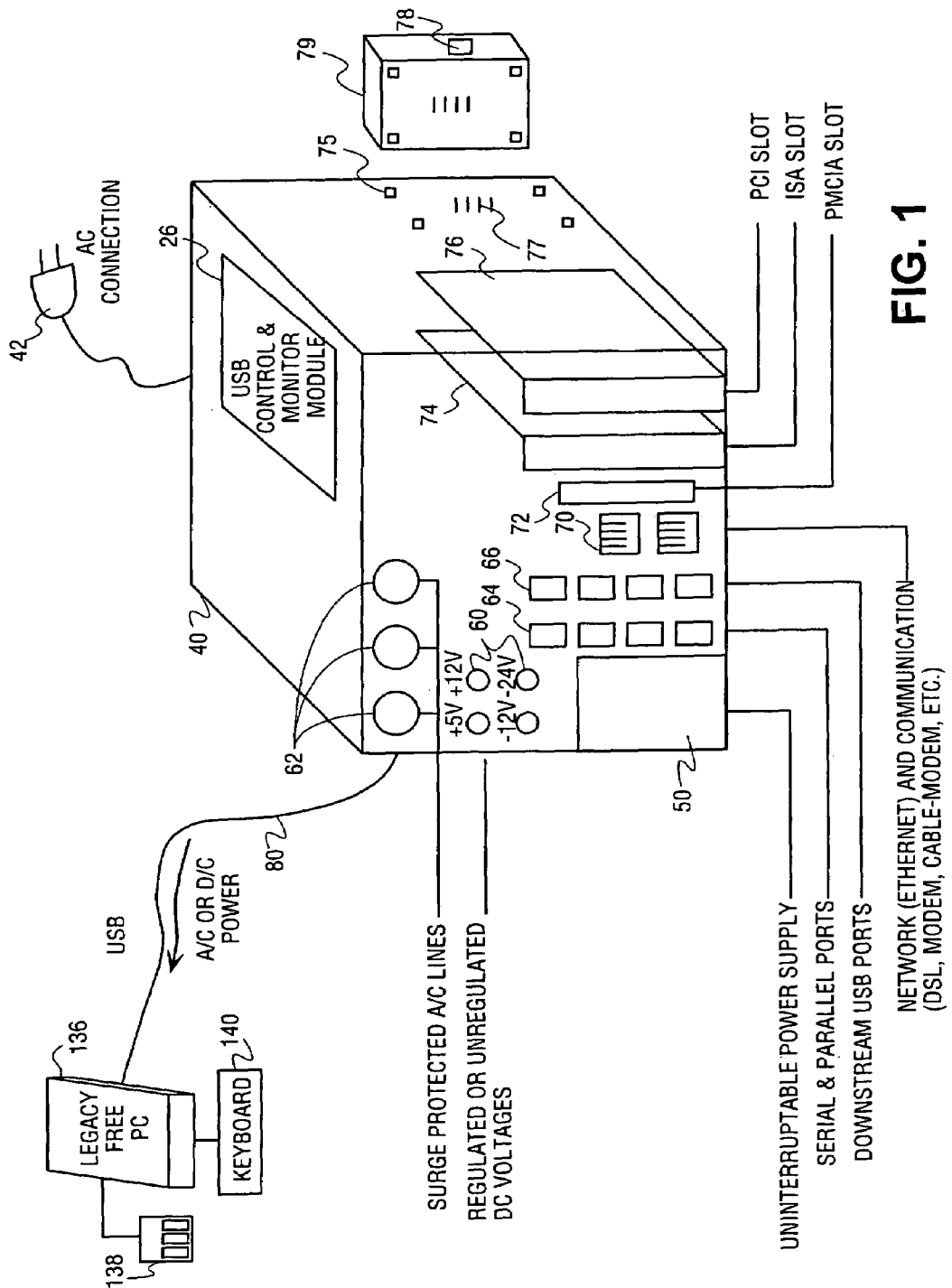
FIG. 1 is a schematic diagram of a system of one embodiment of the invention.

FIG. 1 is a schematic diagram of a system of one embodiment of the invention. A legacy free PC 136 has coupled thereto a mouse 138 and a keyboard 140. The legacy free PC provides at least one external connectivity (in this embodiment, USB). Accordingly, the legacy free PC 136 is coupled to a combined uninterruptible power supply and bus control module contained within the housing 40. The USB connection 80 provides both the USB signaling as well as power to the legacy free PC 136. In addition to the uninterruptible power supply 50 and the USB control and monitor module 26, support for alternative connectivities and various legacy expansion systems may be provided within the housing 40. For example, the housing may be equipped with various serial or parallel ports 64, additional downstream USB ports 66, as well as network and communications ports, such as Ethernet ports, DSL modem or cable modem ports 70. Additionally, the housing may be equipped with a PCMCIA slot 72, an ISA slot 74, a PCI slot 76, or any other legacy support slot. Various regulated or unregulated DC voltages can be supplied to external nodes 60. Additionally, surge protected AC lines 62 may be provided to which external devices may be coupled. A standard power cord 42 may provide AC connection via a standard wall socket.

It is also within the scope and contemplation of the invention for various legacy support modules 79, such as support for PCI or ISA to be fabricated to modularly attach to the housing 40. In such embodiments, housing 40 provides coupling points 75 for engagement by the snap-on modules 79. Mechanical and electrical connections 76 on the housing 40 retain each module firmly in place while providing power and communication between the module and the main unit. Power and communication may be provided through a USB link in one embodiment of the invention. The housing 40 may also provide connection ports for non-legacy I/O, such as USB or 1394 buses. In this manner, an extra port 81 may be modularly added to the unit.

Figure 2:
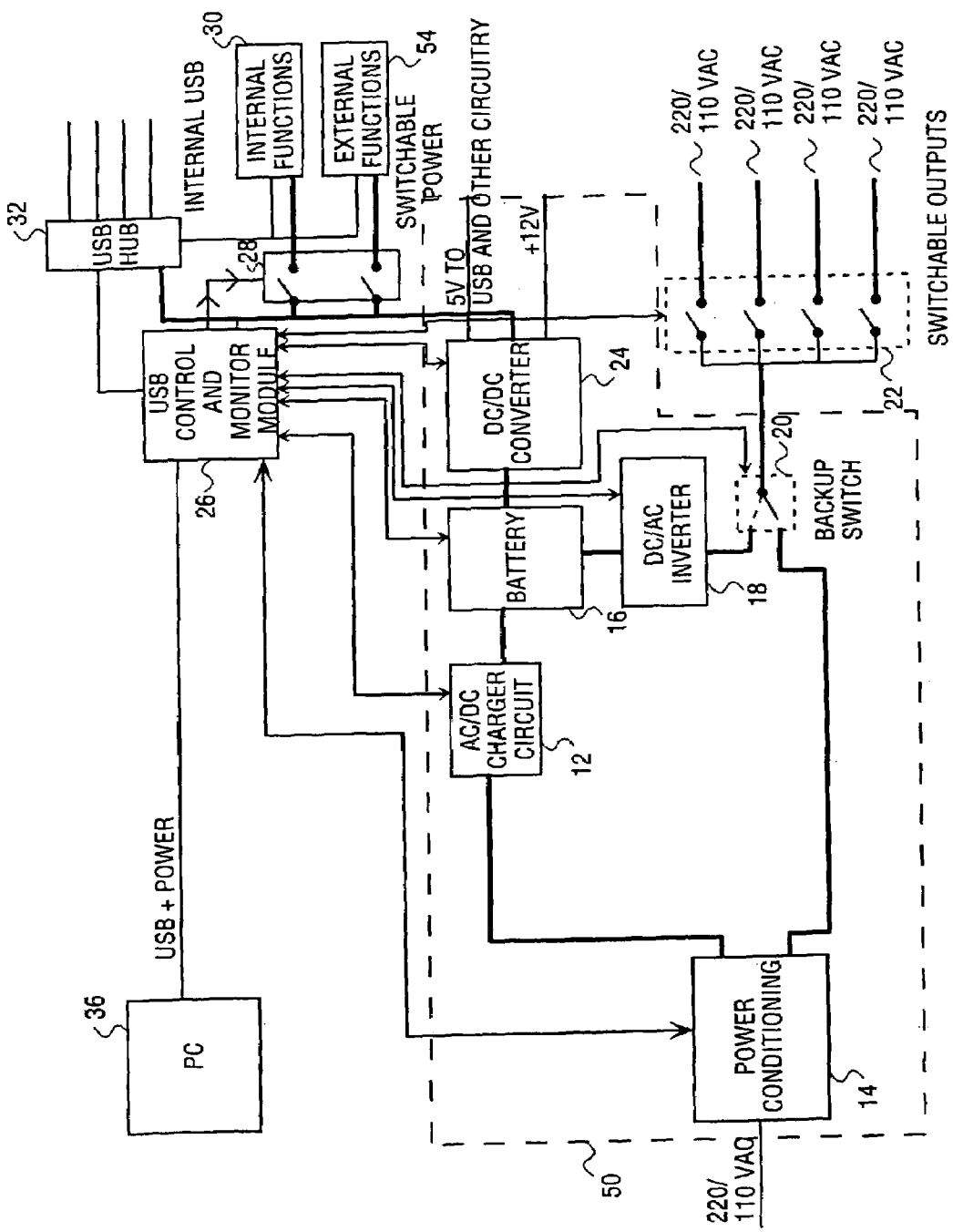
FIG. 2 is a block diagram of a system of one embodiment of the invention.

FIG. 2 is a block diagram of a system of one embodiment of the invention. PC 36 is coupled to a USB controller monitor module 26 through which PC 36 is supplied external connectivity and power. PC 36 may be, but need not be, a legacy free PC. In this figure, unless otherwise specified, power distribution lines are represented by thick lines, while thin lines represent control or signal lines. An incoming power signal, typically 220 or 110 volts AC, is supplied to the power conditioning circuit 14. The power conditioning circuit 14 may provide surge protection. In some embodiments, the power conditioning circuit 14 may also provide power phase correction. The output is supplied to AC/DC charger circuit 12 which converts the AC power signal into DC and uses the DC to charge battery 16. The output of the power conditioning circuit 14 is also supplied to a backup switch 20 that is provided between power conditioning circuit 14 and a set of switchable power output nodes. Backup switch 20 selects which of the power conditioning circuit 14 and the battery 16 supply power to the output nodes. In the event of a power failure, battery 16 supplies power through DC/AC inverter 18. DC/AC inverter 18 converts the battery power supplied to the output nodes 110/220 VAC.

In any case, the battery 16 supplies power to a DC/DC converter 24 which generates desired DC voltages, such as +5 volts, for use by USB and other circuitry. Moreover, by supplying devices with DC rather than AC additional conversion steps are avoided. Since current external devices expects AC, integration of the USB hub and functions with the control module and UPS permits those devices to be supplied DC directly reducing system costs.

It is also within the scope and contemplation of the invention to supply the PC 36 with DC power via the control and monitor module 26. Alternatively, the power supplied to the PC may be the traditional 220 or 110 volts AC. The USB and monitor module 26 monitors each subunit of UPS 50. Additionally, the control and monitor module 26 controls a plurality of switches 22 which provide external power. Thus, in low power modes, the control and monitor module can select to leave one, all, none, or any combination of the externally powered devices powered. Control and monitor module also controls and monitors the power supplied to internal functions 30 and external modems 54, as well as USB hub 32. By providing additional independently controllable switches 28, internal functions 30 may be powered or left unpowered depending on the desired power state of the system.

Firmware within the control and monitor module can provide legacy conversion from various legacy protocols to USB so that data received using such legacy protocols can be forwarded to the PC over the USB link for processing.

By moving the legacy support to an external module outside of the PC, cost and size of the PC is diminished. Additionally, by providing control of each subunit and each external connection through a central control and monitor module, control of the overall power consumption of the system is facilitated. Moreover, while legacy support can be moved outside the PC, the UPS and control unit also serves as an ideal connection point for non-legacy devices.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A device for expanding a computer interface, comprising:
   an upstream connector for connecting to a computer through a serial bus using a serial bus protocol, wherein the device is external to the computer;
   at least one legacy expansion bus structure, each legacy expansion bus structure having a legacy bus protocol; and
   a bus control module connected to the upstream connector and to the at least one legacy expansion bus structure, wherein the bus control module is adapted to provide a protocol conversion between the serial bus protocol and the legacy bus protocol, and is adapted to provide power to the computer through the serial bus.

2. The device of claim 1, wherein the at least one legacy expansion bus structure includes a PCI bus structure.

3. The device of claim 1, wherein the at least one legacy expansion bus structure includes an ISA bus structure.

4. The device of claim 1, wherein the at least one legacy expansion bus structure includes an EISA bus structure.

5. The device of claim 1, wherein the at least one legacy expansion bus structure includes a PCMCIA bus structure.

6. The device of claim 1, further comprising at least one expansion slot connected to the at least one legacy expansion bus structure.

7. The device of claim 6, further comprising at least one expansion card for coupling with the at least one expansion slot, wherein the at least one expansion card includes at least one serial port.

8. The device of claim 6, further comprising at least one expansion card for coupling with the at least one expansion slot, wherein the at least one expansion card includes at least one parallel port.

9. The device of claim 6, further comprising at least one modem connector connected to the at least one legacy expansion bus structure.

10. The device of claim 6, further comprising at least one network connector connected to the at least one legacy expansion bus structure.

11. The device of claim 6, further comprising at least one DSL port connected to the at least one legacy expansion bus structure.

12. The device of claim 6, further comprising at least one cable modem port connected to the at least one legacy expansion bus structure.

13. The device of claim 1, wherein the serial bus includes a Universal Serial Bus (USB).

14. The device of claim 1, further comprising an uninterruptible power supply (UPS) coupled to and controlled and monitored by the control module.

15. The device of claim 14, wherein the bus control module controls a plurality of switches to control power from the UPS to a plurality of external devices.

16. A device for expanding a computer interface, comprising:
    an upstream connector for connecting to a computer through a Universal Serial Bus (USB) using a USB protocol, wherein the device is external to the computer;
    a PCI bus structure having a PCI bus protocol; and
    a bus control module connected to the upstream connector and to the PCI bus structure, wherein the bus control module is adapted to provide a protocol conversion between the USB protocol and the PCI bus protocol, and is adapted to provide power to the computer through the USB.

17. A method for expanding a computer interface, comprising:
    providing at least one legacy expansion bus structure in a device external to a computer, wherein each legacy expansion bus structure has a legacy bus protocol;
    communicating between the device and the computer using a serial communication protocol
    providing power to the computer through a serial communication bus; and
    providing a protocol conversion between the serial communication protocol and the legacy bus protocol for each of the at least one legacy expansion bus structure.

18. The method of claim 17, wherein providing at least one legacy expansion bus structure includes providing a PCI bus structure.

19. The method of claim 17, wherein providing at least one legacy expansion bus structure includes providing an ISA bus structure.

20. The method of claim 17, wherein providing at least one legacy expansion bus structure includes providing an EISA bus structure.

21. The method of claim 17, wherein providing at least one legacy expansion bus structure includes providing a PCMCIA bus structure.

22. The method of claim 17, wherein communicating between the device and the computer using a serial communication protocol includes communicating between the device and the computer using a USB protocol.

23. A method for expanding a computer interface, comprising:
    providing a PCI bus structure in a device external to a computer, wherein the PCI bus structure has a PCI bus protocol;
    communicating between the device and the computer using a USB protocol;
    providing power to the computer through the USB; and
    providing a protocol conversion between the USB protocol and the PCI bus protocol.

* * * * *